Nov. 14, 1933.  B. F. BAKER  1,934,691
POWER ACTUATOR
Filed May 25, 1931
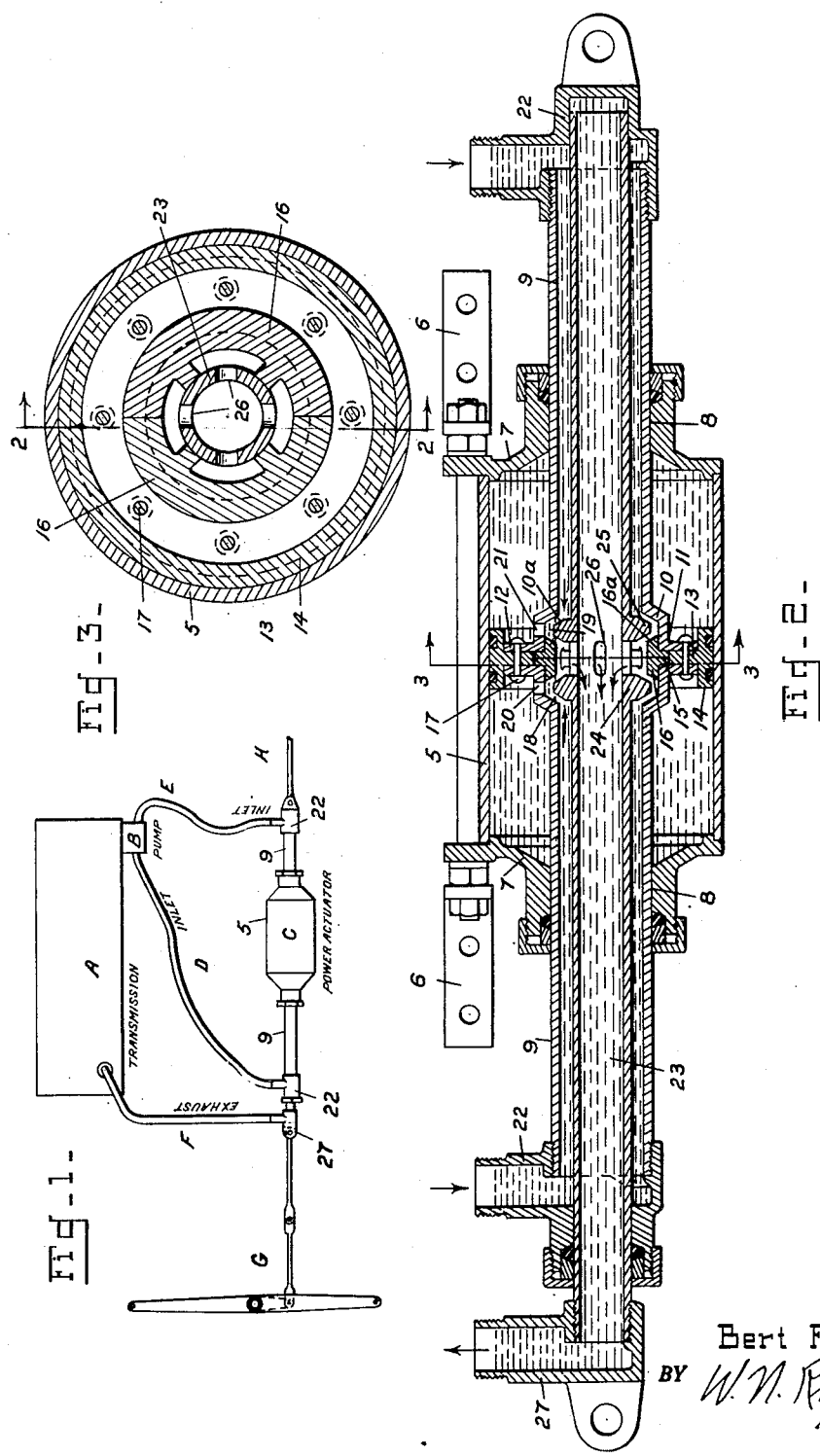
INVENTOR.
Bert F. Baker
BY W. N. Roach
ATTORNEY

Patented Nov. 14, 1933

1,934,691

UNITED STATES PATENT OFFICE 1,934,691

POWER ACTUATOR

Bert F. Baker, Davenport, Iowa

Application May 25, 1931. Serial No. 539,963

2 Claims. (Cl. 121—41)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a power actuator particularly applicable to brake and steering mechanism of vehicles.

The purpose of the invention is to provide a power actuator that will permit of a small, compact arrangement of the various elements, that will be simple in construction and positive in operation, and that may be readily associated with the power transmission of the vehicle.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a more or less diagrammatical illustration in the nature of a plan view of the complete power actuator.

Fig. 2 is a longitudinal sectional view through the actuator unit.

Fig. 3 is a sectional view on the line 3—3 of Fig. 2.

Referring to Fig. 1 there is shown the change speed transmission mechanism and casing A of a vehicle, a pump unit B associated therewith, a power actuator unit C having inlet lines D and E leading from the pump unit and having an exhaust line F leading to the transmission mechanism, and a control mechanism G for the actuator unit C.

The actuator unit C shown in detail in Figs. 2 and 3 comprises a cylinder 5 which is to be secured by means of brackets 6—6 to some part of the vehicle frame. The end plates 7—7 of the cylinder each provide a bearing 8 for mounting similar tubular piston rods 9—9.

Each of the piston rods is formed adjacent its inner end with an inclined offset 10 leading to a terminal portion 11 parallel to the axis of the rod and ending in a perpendicular flange 12. The flanges 12 of the two piston rods are assembled in spaced relation and confine the internal rib 13 of a piston head 14 as well as the external rib 15 of an annular valve block 16. Pins 17 passing through the flanges 12 and the rib 13 retain the assembly so that the piston and the opposite piston rods form a single unit.

The valve block 16 is formed with beveled rims 16a—16a constituting valve seats and the internal face 10a of each offset 10 also constitutes a valve seat. The faces 10a and 16a cooperate to form a pair of spaced valve chambers 18 and 19, the chamber 18 being in communication with the cylinder on the forward side of the piston head by means of ports 20 in the portion 10 of the piston rod and the chamber 19 being similarly in communication through the ports 21 with the cylinder in rear of the piston head.

On the outer ends of the connected piston rods 9—9 there are attached fittings 22—22 one of which provides for attachment of the inlet line D and the other for the inlet line E. The rear fitting 22 is connected with the member H that is to be operated. The fittings 22 slidably support a tubular valve rod 23 in spaced relation to the piston rods 9. On the valve rod 23 intermediate its length are a pair of spaced double-faced disc valves 24 and 25, the former disposed in the valve chamber 18 and the latter disposed in the valve chamber 19. The portion of the valve rod between the valves 24 and 25 is spaced from the valve block 16 and is provided with ports 26.

On the forward end of the valve rod there is a fitting 27 providing for attachment of the exhaust line F and the control mechanism G.

In the normal position of the parts shown in Figs. 1 and 2 the control mechanism is in neutral and the valves 24 and 25 are disposed centrally of the valve chambers 18 and 19, out of contact with the valve seats. The fluid element, such as oil, with which the device is filled is then free to be circulated without producing any effect on the piston head. The fluid is driven by the pump unit B through the inlet lines D and E and thence by way of the piston rods 9—9 to the cylinder 5 and through the ports 26 in the valve rod to the exhaust line F. The fluid is then delivered to the change speed transmission casing A where it is available to lubricate the gearing contained therein, and be repassed through the pump unit B. The pressures on opposite sides of the movable elements of the mechanism will maintain the valves 24 and 25 in the neutral position shown in Fig. 2.

In applying a force that is to be augmented by the power actuator unit, the control mechanism is operated to impart a forward or a rearward movement to the valve rod 23. Assuming for example that the valve rod is moved forwardly the valve 24 is brought up against the front valve seat 10a and arrests the flow of liquid entering the piston rod from the inlet D. The liquid in the front part of the cylinder 5 is free to be exhausted through the ports 20 and 26. The valve 25 is brought up against the rear valve seat 16a thereby cutting off communication with the exhaust ports 26 but permitting the liquid to pass through the port 21 and enter the cylinder 5 in rear of the piston head.

Since the pump unit B is in operation, the liquid in rear of the piston having no outlet will be placed under pressure and move the piston unit forwardly in the cylinder. The operator of the control mechanism in acting on his control has only to exert sufficient force on the valve rod to maintain the valves 24 and 25 in the described position. When the operator discontinues his effort and the movement of the valve rod is arrested the piston unit will continue to move relative to the valve rod and reestablish the neutral position of the valve with respect to the valve seats. As previously mentioned in such neutral position a free circulation prevails throughout the system.

The operation during rearward movement of the valve rod is identical with that just described, the functions of the valves 24 and 25 being reversed.

When the pump unit B is not in operation, either through design or failure, the piston unit is manually reciprocable upon movement of the valve rod, the connection being effected through the valves 24 and 25.

1 claim:

1. In a piston construction, a pair of coaxial tubular piston rods having their adjacent ends similarly offset and flanged, ports between the offset and flange whereby the interior of the offset constitutes a valve seat, an annular valve block between the ports and having an external rib confined between the flanges of the piston rods, a piston head having an internal rib confined between the flanges of the piston rods, securing means passing through the flanges and internal rib of the piston head, and a valve rod slidably supported in the piston rods.

2. In a piston construction, a pair of coaxial tubular piston rods having their adjacent ends similarly offset and flanged, ports between the offset and flange, an annular valve block between the ports and having an external rib confined between the flanges of the piston rods, a piston head having an internal rib confined between the flanges of the piston rods, and securing means passing through the flanges and internal rib of the piston head.

BERT F. BAKER.